Nov. 20, 1934. C. H. LEACH Re. 19,378

OIL REFINING APPARATUS

Original Filed Dec. 31, 1926 6 Sheets-Sheet 1

Witness
Frederick S. Grunbaf.

Inventor
Charles H. Leach
by his Attorneys
Van Evera Fitzhugh & Van Evera

Nov. 20, 1934. C. H. LEACH Re. 19,378

OIL REFINING APPARATUS

Original Filed Dec. 31, 1926 6 Sheets-Sheet 2

Witness
Frederick S. Greenleaf

Inventor
Charles H. Leach
by his Attorneys
Venn Everson Fish & Hilbert & Clay

Nov. 20, 1934. C. H. LEACH Re. 19,378

OIL REFINING APPARATUS

Original Filed Dec. 31, 1926 6 Sheets-Sheet 3

Witness
Frederick S. Greenleaf

Inventor,
Charles H. Leach,
by his Attorneys
Van Cleven Fish & Hildebrand Harry

Nov. 20, 1934. C. H. LEACH Re. 19,378

OIL REFINING APPARATUS

Original Filed Dec. 31, 1926 6 Sheets-Sheet 4

Witness
Frederick S. Grunsky

Inventor
Charles H. Leach
by his Attorneys
Van Fremont Fish Hitchcock & Coy.

Nov. 20, 1934. C. H. LEACH Re. 19,378

OIL REFINING APPARATUS

Original Filed Dec. 31, 1926 6 Sheets-Sheet 5

Witness
Frederick S. Greenleaf

Inventor
Charles H. Leach
by his Attorneys
Van Everen Fish Hilliard & Carr

Nov. 20, 1934. C. H. LEACH Re. 19,378

OIL REFINING APPARATUS

Original Filed Dec. 31, 1926 6 Sheets-Sheet 6

Witness
Frederick S. Greenleaf

Inventor
Charles H. Leach
by his Attorneys
Van Evenen Fish & Hildreth Clay

Reissued Nov. 20, 1934

Re. 19,378

UNITED STATES PATENT OFFICE 19,378

OIL REFINING APPARATUS

Charles H. Leach, Roselle, N. J.

Original No. 1,821,347, dated September 1, 1931, Serial No. 158,212, December 31,1926. Renewed February 26, 1931. Application for reissue August 29, 1933, Serial No. 687,379

36 Claims. (Cl. 257—223)

The present invention relates to oil refining apparatus and more particularly to apparatus of this general character designed for condensing oil vapors in an accurate and predetermined manner.

One object of the present invention is to improve and reorganize apparatus of this character in order to improve the performance and markedly increase the efficiency of operation.

A further object of the present invention is to provide a design to which access may be had for cleaning purposes and replacement of parts with a minimum of labor in dismantling.

With these and other objects in view, the various features of the invention consist in certain novel features of construction, combinations and arrangements of parts, as hereinafter claimed, the advantages of which will be apparent to those skilled in the art from the following description. In the accompanying drawings illustrating the preferred form of the invention, Fig. 1 represents an elevation partially in section of a condensing apparatus embodying the features of the invention;

The apparatus shown in the illustrated embodiment of the invention is designed for the accurate fractionation of hot vapors derived from the refining of crude oil. The condensing of these vapors in the present apparatus is accomplished by an interchange of heat between the vapor and the cooling medium or mediums, such as cold charge oil or charge oil and water. An accurate control of the temperature of the vapor during its passage through the condensing apparatus is obtained by a variation of the path of flow of either or both of the cooling mediums. The apparatus therefore serves not only to permit fractionation of the oil vapors with sufficient accuracy for many purposes, but in addition serves to impart otherwise waste heat from the oil vapor to the crude charge oil. The apparatus representing an embodiment of the present invention is designed primarily for the handling and condensation of hot vapors under relatively high pressures and temperatures. To this end, not only is the apparatus designed to handle the requisite temperatures and pressures with safety, but in addition provision is made for rendering the interior of the apparatus readily accessible in order to permit frequent clean-out, if desired. Furthermore, the apparatus is designed to permit relatively high velocity of the oil vapor without substantially impeding the path of flow, while at the same time compelling or causing the desired transfer of heat to take place, and to minimize to the utmost the corrosive effect of the hot oil condensate which may otherwise seriously limit the effective life of this type of construction.

Figure 1:
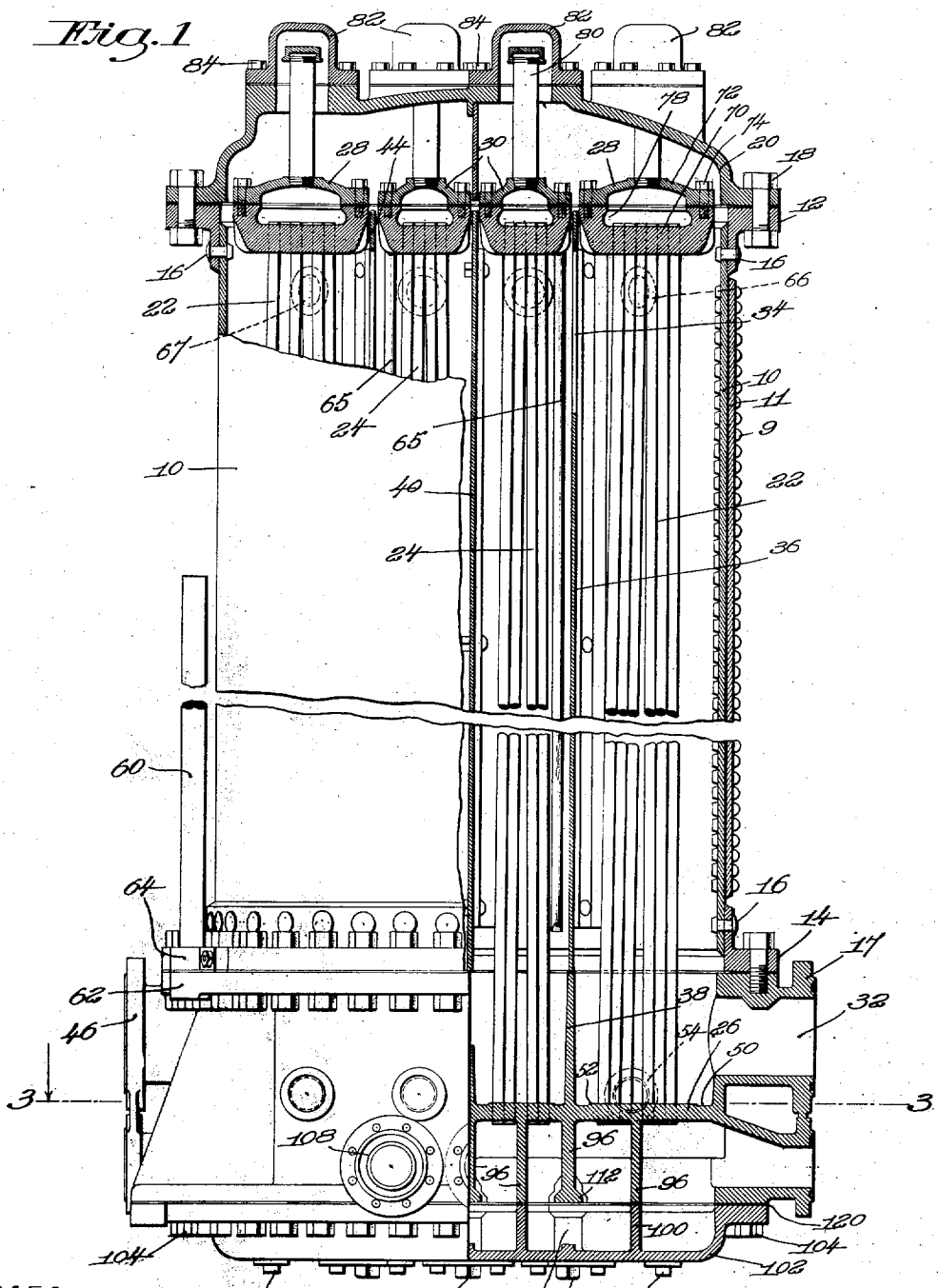
Figure 2:
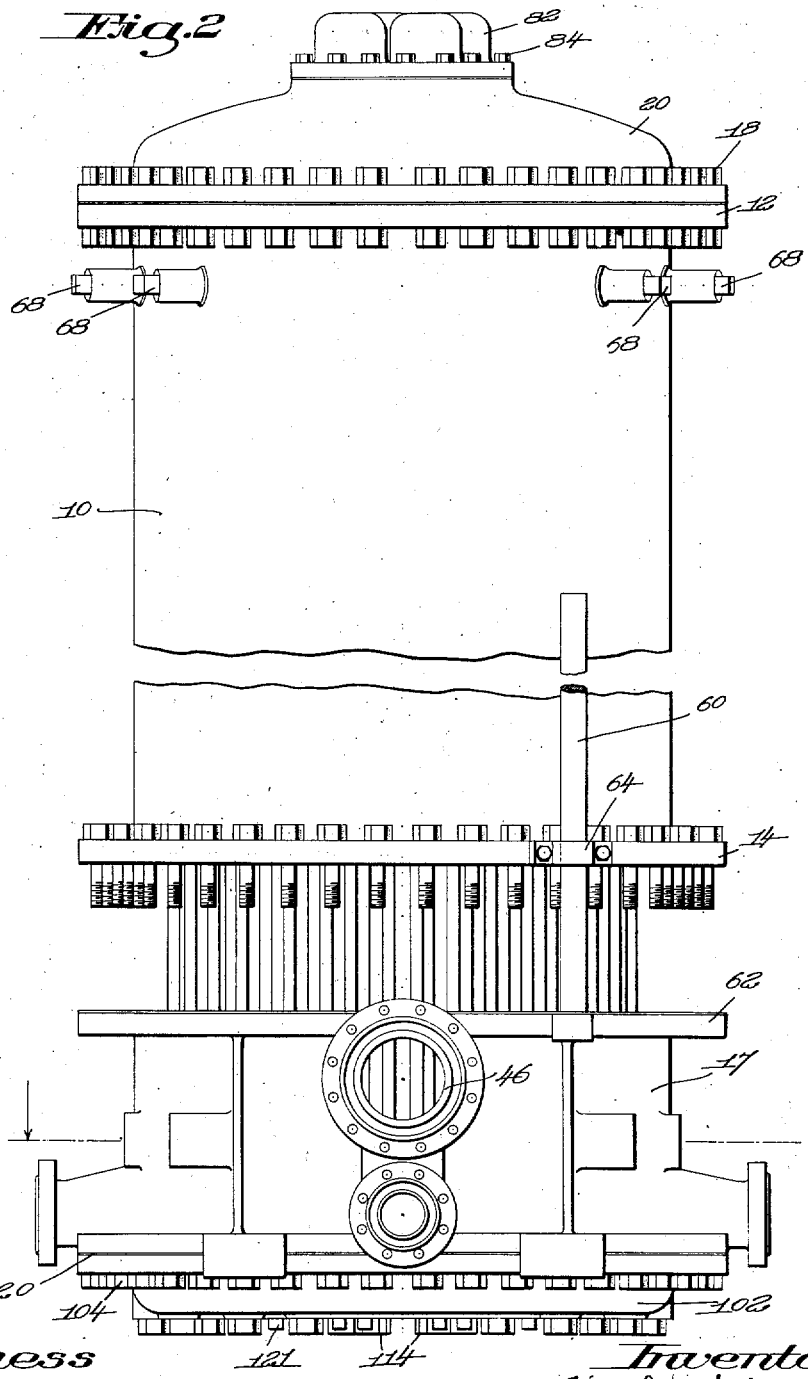
Fig. 2 is an elevation similar to Fig. 1 and at right angles thereto illustrating the shell partially removed to permit access to the interior and to the tube bundles enclosed thereby.
Figure 3:
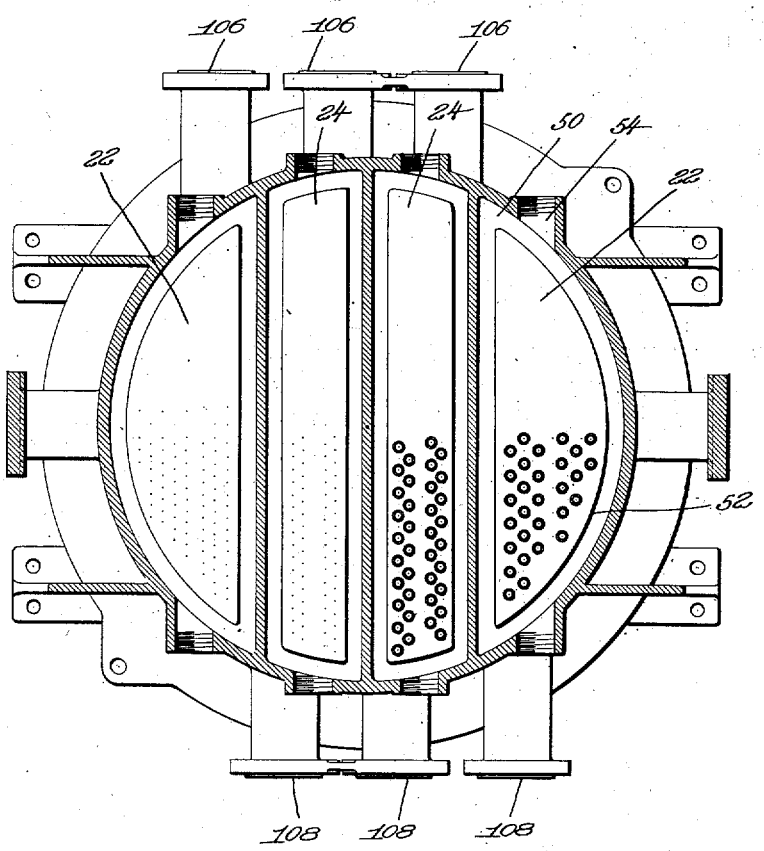
Fig. 3 is a section upon the line 3—3 of Fig. 1, illustrating that portion of the unitary tube support above the integral web.
Figure 4:
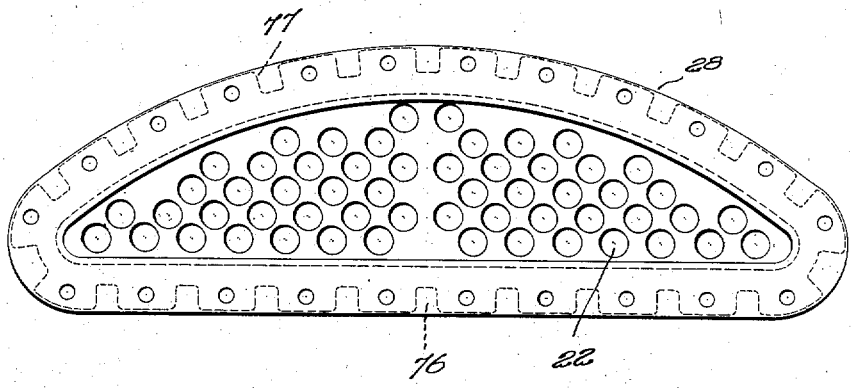
Fig. 4 is a detail illustrating a portion of one of the floating heads showing the openings for mounting the upper ends of the tubes.
Figure 5:
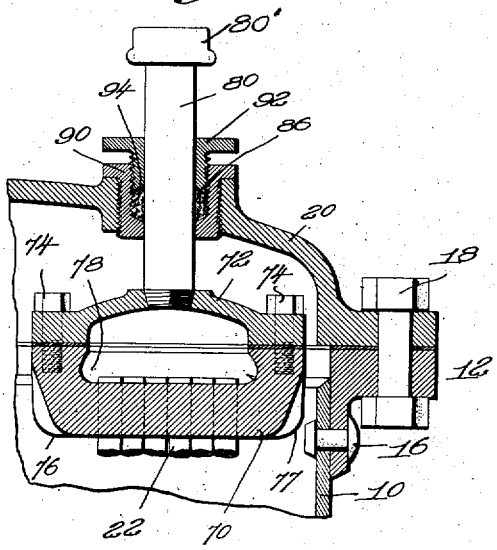
Fig. 5 is a detail illustrating a section of one of the floating heads with a modified form of clean-out connection.
Figure 8:
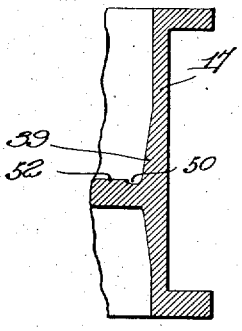
Fig. 8 is a detail illustrating a section of the head casting and showing the manner in which the outer wall is thickened at the base.
Figure 6:
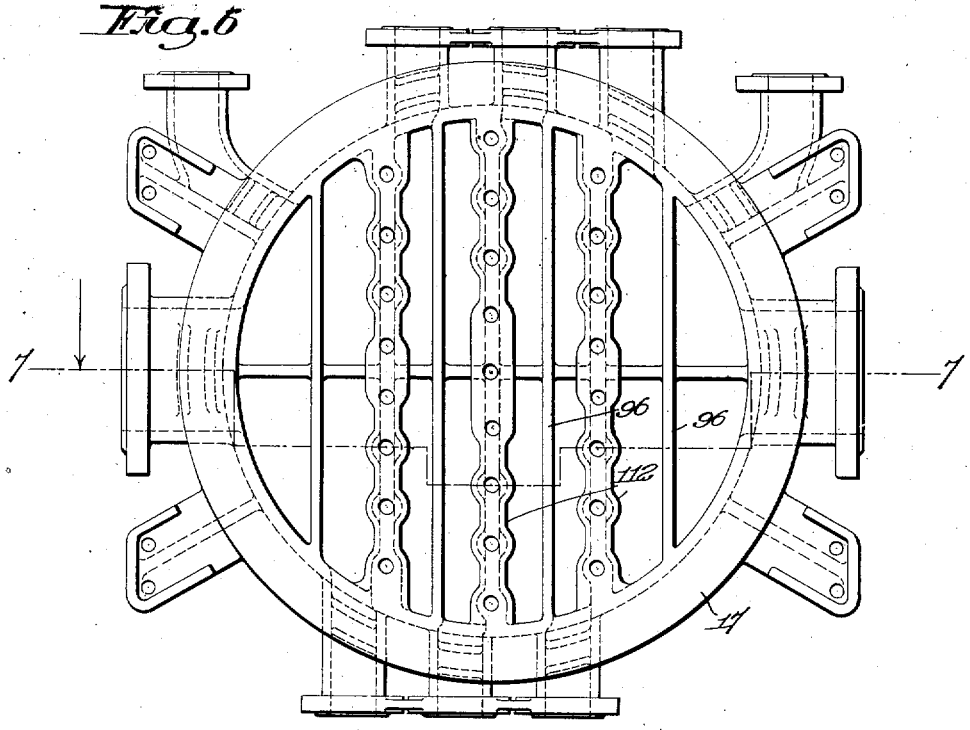
Fig. 6 is a detail illustrating a bottom plan view of the head casting forming a combined tube support, vapor connection and passages for the flow of cooling medium.
Figure 7:
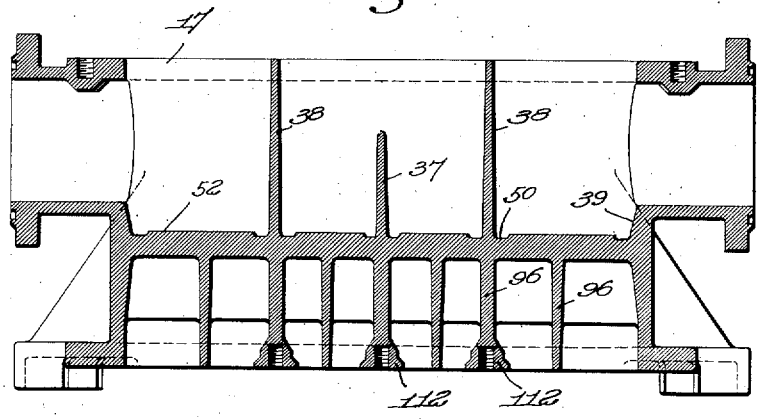
Fig. 7 is a section of the head casting shown in Fig. 6 upon the line 7—7.
Figure 9:
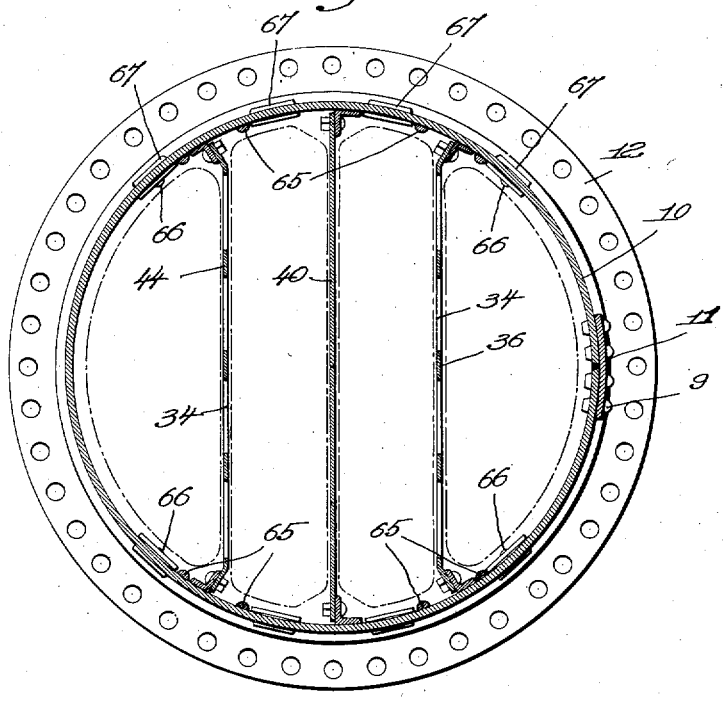
Fig. 9 is a detail illustrating a section of the enclosing shell and connected baffles.
Figure 10:
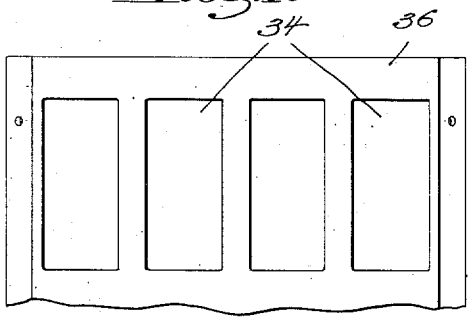
Fig. 10 is a detail illustrating the grid passages formed in the baffles for the flow of vapor therethrough.

Referring to the drawings, the apparatus comprises a tubular rolled shell 10 of generally cylindrical form, having a longitudinal seam closed by a plate 11 connected to the shell by rivets 9. The shell is provided at opposite ends with relatively heavy bolting flanges 12 and 14 connected to the shell by a series of rivets 16, as indicated in Fig. 1. The shell is normally supported in a vertical position, although it may conceivably depart somewhat from this position if desired, and is connected at its lower end to a tube support 17 which not only forms the support for the enclosing shell but also provides a unitary support for the lower ends of the several tube bundles, as more fully described hereinafter. The upper end of the shell is connected by bolts 18 to a cover member 20, which extends completely over the floating heads and encloses the space thereabove. Enclosed within the shell and connected at their lower ends to the support 17 is a series of tube bundles, indicated more particularly in Fig. 3 and described for convenience as outer bundles 22 and inner bundles 24. The lower ends of the tubes comprising these bundles are flanged into a transverse web 26 forming a part of the head 17, as will be clearly evident from an inspection of Fig. 1. The upper end of each tube bundle is connected to a floating head, these heads being indicated at 28 and 30, respectively. With this construction it will be evident that each tube bundle is permitted to expand and contract independently of each other bundle, thus minimizing the strains otherwise imposed upon the tube connections. The oil vapor is caused to pass through the intertubular space enclosed by the shell and surrounding the several tube bundles. This vapor is admitted to the lower portion of the tubular space by virtue of an inlet nozzle 32 formed integrally in the head 17, as indicated in Fig. 1. From the inlet nozzle the vapor passes upwardly lengthwise of the entire outer bundle, and at the upper portion thereof is directed into communication with the next tube bundle by the floating head and a series of grid-like passages 34 formed in the upper portion of a baffle member 36 which extends lengthwise of the shell between the outer and inner tube bundles. This baffle is connected at opposite edges to the enclosing shell, and at its lower edge cooperates with an integral partition or guide 38, extending upwardly from the web 26 to form a partition and extending completely to the bottom of the tubes for initially directing the flow of the hot vapor. After its passage through the outer bundle of tubes, the hot vapor is caused to pass downwardly through the first inner bundle of tubes, this flow being controlled by the baffle 36 adjacent to the baffle 40. As indicated more particularly in Fig. 1, the baffle 40 is connected to the shell and extends upwardly between adjacent floating heads to prevent passage of vapor from one tube bundle to the next at this point. The lower end of the baffle 40 terminates short of rib 37 to provide an opening for directing the vapor about the next adjacent tube bundles, and thence upwardly. After passing upwardly through the next inner bundle, the direction of flow of the vapor is reversed by the passages formed in a baffle 44, causing the vapor to flow downwardly through the outer bundle 22 from which the vapor is discharged through an outlet nozzle 46 formed integrally with the head 17 opposite the inlet 32. The provision of the grid-like passages between successive passes serves the dual function of directing the vapor from one pass to the next and for diffusing and creating turbulence in the vapor to improve the interchange of heat between the vapor and the condenser tubes. Furthermore, those portions of the baffle members between the openings constitute guides to permit relative longitudinal movement of the baffles and floating heads upon partial or complete removal of the shell. It is probable also that the passages, formed as indicated, aid in the elimination of condensate which might otherwise be entrained in the vapor, and carried thereby from one pass to the next. As the vapor passes through the successive chambers formed by the lengthwise baffles, a definite proportion is condensed and flows downwardly along the partitions and the exterior of the tubes. This condensate is collected in the lower portion of each chamber by collecting basins in the form of depressed gutters 50. As indicated more particularly in Figs. 1 and 3, these gutters extend completely about the lowermost portion of each tube bundle and surround an elevated pad 52 into which the lower end of the tube bundle extends. Communicating with the lowermost portion of each gutter is a condensate outlet 54 which causes a complete drainage of condensate separately from the individual vapor passes. This construction, as hereinbefore described, has several distinct and marked advantages in connection with the condensation of highly-corrosive, hot oil vapors. In the first place, it will be evident that the unitary support 17, which may be preferably formed as a casting which has a greater resistance to corrosion than the thinner walls of the shell or baffle plates and the tubes, is so designed as to encounter the major portion of the corrosive effect. The hot condensate which is an active corrosive agent is in contact with the tubes, baffles and wall of the shell for a minimum of time, this condensate immediately draining into the gutters formed in the head casting and being thereby removed from the lower ends of the tubes and the other portions of the apparatus susceptible to corrosion. Furthermore, the hot oil vapor, upon entering the interior of the intertubular space through the nozzle 32, first impinges upon the guiding partition 38 formed as an integral portion of the head casting, so that possible corrosion of the baffles controlling the vapor passes is minimized at this point. An inspection of the head casting illustrated in Fig. 7 indicates that not only the partition ribs 38 but the annular wall of the head member, forming the outer wall of the base, is tapered at 39 to increase the wall thickness exposed to the corrosive effect of the condensate. In addition, it will be evident with this construction that a partial or a complete removal of the enclosing shell may be obtained by merely disconnecting the bolts which secure the lower end of the shell to the casting 17. Thereafter the elevation of the shell exposes the interior of the tube bundle without dismantling the vapor or liquid connections. In order to facilitate the removal of the enclosing shell without liability of damage to the tube bundles or interference therewith, a series of guides 60 are rigidly mounted at their lower ends in an annular flange 62 forming a part of the head 17. These vertical guides are received loosely in bosses 64 formed upon the bolting flange 14 and serving to guide the lower end of the shell as it is elevated, and prevent contact or interference with the tube bundles enclosed thereby. The withdrawal of the shell with the connected baffles is furthermore facilitated by the extension of the baffles upwardly between each two adjacent floating heads, as indicated more particularly in Fig. 1, the upper ends of the baffles serving to center and maintain the heads in the proper relationship and prevent liability of interference between the heads and the baffles upon withdrawal of the shell with the baffle. During the withdrawal of the shell, the floating heads are further centered, due to the provision of longitudinal guides 65 secured to the shell and having a sufficient inward projection to protect the floating heads against contact with the securing rivets and other projections on the inner portion of the shell. As indicated more particularly in Fig. 9, additional short guides 66 are provided adjacent the floating heads and upper cleaning openings. The manner in which the shell may be partially or entirely withdrawn from the supporting head and tube bundles is clearly indicated in Fig. 2, which illustrates the bolting flanges disconnected and the shell partially elevated with the guides 60 serving to control the position of the lower end. The withdrawal of the shell not only permits a cleaning of the interior of the tubular space and the exterior of the tubes themselves, but in addition permits replacement of the tubes. Access to the interior of the intertubular space without removing the shell may be had through a series of peep-holes or openings 67 formed in projections extending from the shell adjacent the upper end, the openings being normally closed by threaded plugs 68. These cleaning openings formed in this manner permit convenient attachment of a line for the delivery of cleaning medium, the space surrounding individual tube bundles thus being capable of flushing without dismantling any of the permanent inlet or outlet connections. The location of the cleaning openings at the upper ends of the tube bundles, just beneath the floating heads, permits the cleaning fluid to flow downwardly lengthwise of the tubes and effect a thorough and adequate cleaning throughout the entire tube length. As stated previously, the upper end of each tube bundle is connected to a floating head consisting generally of an under portion 70 surmounted by a cover 72 connected thereto by bolts 74. The two portions of the floating head encompass a closed chamber which controls the flow of cooling medium through the interior of the tubes. As indicated more particularly in Figs. 4 and 5, each under portion of the floating head is tapered or beveled at 76 and 77 to facilitate the withdrawal of the shell and connected baffles, and to initiate the movement of the heads properly with relation thereto. The under body of the floating head is recessed between bolting locations in order to avoid imperfections in casting the body with consequent liability of leakage about the bolt openings. With this construction, not only does the casting have the desired strength with a considerable decrease in weight, but the liability of leakage, especially throughout a series of bolting connections, is entirely eliminated. In addition, the chamber 78 encompassed by the lower portion of the head is provided with reentrant side walls to permit a compact and close arrangement of the tube bundles with relation to the outer margin of the chamber, and to initiate reversal of flow of the cooling medium therethrough. By constructing the head in this manner, the outer tubes in each bundle may be located within close proximity of the outer surface of the head, thus reducing to a minimum the space occupied by the overhang of the floating heads beyond the tube bundle. Furthermore, a space is provided at the outer upper ends of the outer tubes of each bundle for the proper application of a flanging head by which these tubes may be connected to the under portion of the head. It will be evident from an inspection of Figs. 1, 4 and 5 that this construction permits a close and compact arrangement of adjacent heads with a disposal of the tubes throughout the major portion of the space occupied by each head. The head indicated in Fig. 4 is one of the two heads connected to the outer tube bundles, this head being shaped to conform to the circumference of the enclosing shell. Access to the interior of the chamber enclosed by each floating head is readily obtained through a riser 80 threaded at its lower end in the cover member, and projecting upwardly beyond the outer enclosing cover 20. Each floating head is provided with such a riser, the upper end of which is closed by a cap 80', and each riser is covered at its upper end by a separate bonnet 82 secured to the cover 20 by bolts 84. With this construction, access to the interior of each tube bundle may be had by removing the enclosing bonnet and cap 80' and connecting a pressure line to the end of the riser without compelling removal of the cover 20 or dismantling of the floating heads. Furthermore, with this construction each entire bundle of tubes may be cleaned under pressure with a saving in time. Fig. 5 illustrates a slightly modified type of cleaning connection in which the risers 80 extend upwardly through the cover 20, the latter being provided with a stuffing box 86 which surrounds the riser and prevents escape of vapor from the interior of the cover member while permitting a sliding movement of the riser and floating head with relation thereto. As indicated in the drawings, this stuffing box is of the usual form comprising a sleeve 90 threaded in an opening formed in the cover 20 and cooperating with a gland 92 to compress the packing or stuffing 94 about the stem 80. The construction illustrated in Fig. 5 is well suited for certain purposes, but where high pressures are employed within the shell and the space enclosed by the cover 20, the construction shown in Fig. 1 is possibly to be preferred.

The flow of cooling medium throughout the interior of the tubes is selectively controlled in a simple and efficient manner. To this end the web or tube support 26 is provided upon its under side with a series of integrally depending partitions 96 which together with the cover 102 and ribs 100 form a series of chambers or passages for directing the flow of cooling medium properly with relation to the interior of each tube bundle. As will be more particularly evident from an inspection of Fig. 1, these partitions are located between each two adjacent tube bundles and also centrally of each bundle, in a manner to compel the flow of cooling medium upwardly through one-half of the tubes in the bundle with a reversal of direction through the remaining tubes in the bundle by virtue of the chambers in the floating heads. Cooperating with the partitions or vanes 96 are a series of partitions 100 formed upon a detachable cover member 102 which is rigidly secured at its outer margin to the under side of the head 17 by bolts 104. Referring again to Fig. 1, it will be evident that certain of the partitions 100 are omitted to provide passages for the flow of cooling medium about the under side of the partitions 96. Cooperating with the partitions formed in the head 17 are a series of inlet nozzles 106 and a series of outlet nozzles 108 which are adapted for the delivery and discharge of one or more cooling mediums in the proper relation to the chambers controlled by the partitions 96 and 100. By suitably varying the connection of cooling medium or mediums to the inlet and outlet nozzles and a suitable selection and variation of cover members having different arrangements of partitions 100, the path or paths of flow of the cooling medium or mediums may be controlled to secure the desired result. In the usual practice, the tube bundle adjacent the discharge end of the hot vapor is ordinarily cooled by water, whereas the remaining tube bundles are cooled by cold oil admitted in one or more charges. As indicated in each case, the cooling medium either water or oil is caused to pass twice through the interior of each tube bundle, this passage of cooling medium being controlled at opposite ends of the tube bundle through the passages formed by cooperating partitions 96 and 100 and the chambers formed in the floating heads 28 and 30. In order to rigidly connect the cover member 102 to the under side of the support 17 and insure a complete closure and separation of the chambers formed by cooperating partitions 96 and 100, the cover member is bolted to the tube support intermediate its periphery. This is accomplished by providing a series of enlarged bosses 110 which surround the securing bolts and cooperate with similar threaded bosses 112 formed in the partitions 96. These threaded bosses 112 are engaged by the ends of retaining bolts 114 which serve to draw the partitions into close contact. The bosses formed upon the cover member may either be a part of the partitions 100 or may be disposed at spaced intervals, as indicated in Fig. 1, where no partition is formed and where a passage is desired beneath the cooperating partition 96. It will be also evident from an inspection of Fig. 1 that the supporting partitions 96 are made of somewhat greater thickness than the partitions which merely serve for the guidance of cooling medium. By the proper location of securing bolts intermediate the periphery of the cover member and through the employment of a sealing gasket 120, inter-communication between the chambers may be completely eliminated. This is of great importance, especially where one chamber contains cooling medium in the form of water and the next adjacent chamber contains cooling medium in the form of heated charge oil. Entrance of the hot oil into the cooling water may well result in a disastrous explosion. The under side of each cover plate is provided with a series of removable plugs 121 which serve for removal of sediment if so desired without disconnecting the cover plate.

What is claimed is:

1. Oil refining apparatus comprising condenser tubes, a transverse tube support connected to the tubes at one end, floating heads connected to the opposite ends of the tubes, a shell enclosing the tubes above the support and detachably connected therewith, inlet and outlet vapor nozzles mounted on the support and communicating with the interior of the shell, a partition extending longitudinally of the tubes between the floating heads supported to permit removal of the shell from about the tube bundles and providing more than one vapor pass extending longitudinally of the tubes in opposite directions, and means for directing cooling medium through the interior of the tubes.

2. Oil refining apparatus comprising a plurality of condenser tubes, a tube supporting partition connected to the tubes at one end, floating heads connected to the opposite ends of the tubes and having receding outer faces to provide a tapering space between adjacent floating heads, a shell surrounding the tubes, and a series of partitions extending longitudinally of the tubes and normally projecting into the tapered spaces between adjacent floating heads.

3. Oil refining apparatus comprising a series of banks of tubes, a single tube support connected to one end of the tubes, a series of floating heads connected to the opposite ends of the tubes, each comprising a body portion having a reentrant chamber formed therein to provide a clearance for the outer tube ends of the bank, and a cover member secured to the body portion and sealing the chamber formed therein.

4. Oil refining apparatus comprising a series of tubes, a head connected to one end of the tubes and having a sealed chamber communicating with the interior of the tubes, a shell surrounding the tubes, a cover member connected to the shell and enclosing a floating head, and means for gaining access to the interior of the chamber in the floating head without disconnecting the cover member.

5. Oil refining apparatus comprising a series of tubes, a head connected to one end of the tubes having a normally closed chamber communicating with the interior of the tubes, a shell enclosing the tubes, a cover member connected to the shell and enclosing the head, a riser extending from the head above the shell and communicating with the chamber in the head, and a bonnet connected to the cover and enclosing the riser.

6. Oil refining apparatus comprising a series of banks of tubes, an independent head connected to each bank of tubes having a normally closed chamber communicating with the interior of the tubes, a shell surrounding the tubes, a cover member connected to the shell enclosing the heads, a riser connected to each head and extending through the cover member, detachable means on the end of each riser affording communication to the chamber, and means connected with the cover member for sealing the openings in the cover through which the risers extend.

7. Oil refining apparatus comprising a series of tubes, a floating head connected to the tubes having a normally sealed chamber communicating with the interior of the tubes, means for enclosing the space about the tubes and head, means extending beyond the closure for affording communication with the interior of the head to permit access to the interior of the head without detaching the closure, and means for sealing the space in a manner to permit a relative movement of the head and communicating means with respect to the closure.

8. Oil refining apparatus comprising a transverse tube supporting partition, a plurality of banks of tubes connected at their lower ends to the partition, an annular member having inlet and outlet nozzles formed therein communicating with the space above the partition, a shell connected at its lower end to the annular member and surrounding the tubes, a plurality of floating heads connected to the opposite ends of the tubes, a plurality of cooling fluid directing passages located beneath the partition, and means located in the plane of division between the floating heads and capable of lengthwise withdrawal for providing more than one vapor pass within the shell.

9. Oil refining apparatus comprising a transverse tube-supporting partition, an annular member about the partition having inlet and outlet nozzles formed therein, an integral partition located above the tube support, a plurality of tubes connected at their lower ends to the support, a shell connected at its lower end to the annular member surrounding the tubes, a plurality of floating heads connected to the opposite ends of the tubes, a cover member connected to the shell and enclosing the floating heads, and a plurality of cooling fluid directing passages located below the partition.

10. Oil refining apparatus comprising a head casting having a transverse tube support formed therein, inlet and outlet nozzles formed in the casting, cooling fluid directing passages formed below the support, cooling fluid nozzles formed in the casting and communicating with the passages, a plurality of tubes connected at their lower ends to the tube supporting partition, a shell connected to the head casting and surrounding the tubes, a detachable cover member connected to the upper end of the shell, and a series of floating heads connected to the upper ends of the tubes and enclosed by the cover member.

11. Oil refining apparatus comprising a tube supporting partition, a plurality of banks of tubes connected to the partition at one end, a plurality of floating heads connected to the tubes at the opposite ends, cooling fluid directing ribs located in a predetermined arrangement on the opposite side of the tube support, certain of the ribs having enlarged portions, a detachable cover member cooperating with the ribs to form passages, and means for connecting the detachable cover member at the enlarged areas of the ribs.

12. Oil refining apparatus comprising a transverse tube support, a plurality of banks of tubes connected at their lower ends to the support, an annular member about the support having an integral rib, inlet and outlet nozzles formed in the annular member and disposed to cause hot vapor to initially impinge upon an integrally formed rib, a shell surrounding the tubes, and a longitudinal baffle cooperating with the rib to provide more than one vapor pass lengthwise of the tubes.

13. Oil refining apparatus comprising a transverse tube support, a series of tubes connected to the support, floating heads connected to the opposite ends of the tubes, a series of transverse cooling fluid directing ribs adjacent the support, a detachable cover member cooperating with the ribs to form passages, and a parallel series of bolting connections joining the intermediate portions of the cover to effectually seal the closed passages formed thereby.

14. Oil refining apparatus comprising a series of tubes, a head connected to the ends of the tubes having a normally sealed chamber communicating with the interior of the tubes, a shell surrounding the tubes, a cover member connected to the shell and closing the space around the head, a riser connected to the head and projecting through and beyond the cover member to afford communication with the chamber, a detachable closure on the end of the riser, and means connected to the cover member for preventing the escape of vapor from within the space enclosed thereby.

15. Apparatus for fractionating oil vapor comprising a plurality of condenser tubes, means for forming a series of vapor passes lengthwise of the tubes, means for cooling the interior of the tubes, and means for creating turbulence in the vapor between successive passes.

16. Apparatus for fractionating oil vapor comprising a plurality of condenser tubes, a shell surrounding the tubes, a longitudinal baffle to provide vapor passes lengthwise of the tubes, grid-like openings formed in the baffle between passes to diffuse and create turbulence in the vapor, and means for cooling the interior of the tubes.

17. Oil refining apparatus comprising a plurality of tubes, a tube support connected to one end of the tubes, a floating head connected to the opposite end of the tubes, a shell surrounding the tubes and detachably connected to the support, and a guiding rib projecting from the interior of the shell and designed to center and guide the floating head by contact therewith upon removal of the shell.

18. Oil refining apparatus comprising a plurality of tubes, a tube support connected to one end of the tubes, a floating head connected to the opposite end of the tubes and having a rounded or tapered portion adjacent the tubes, a shell surrounding the tubes and detachably connected to the support, a series of longitudinal guiding ribs projecting from the interior of the shell at predetermined intervals and serving to engage with and center the floating head upon withdrawal of the shell.

19. Oil refining apparatus comprising a plurality of tubes, a tube support connected to one end of the tubes, a floating head connected to the opposite end of the tubes, a shell surrounding the tubes and detachably connected to the support, and guiding means within and without the shell for centering the shell and floating head upon withdrawal of the shell from about the tubes.

20. Oil refining apparatus comprising a plurality of tubes, a tube support connected to one end of the tubes, a floating head connected to the opposite end of the tubes, a shell detachably connected to the support and surrounding the tubes, an inner guide mounted upon the shell and centering the floating head with respect to the shell upon withdrawal thereof, and outer guide means located in a predetermined position with relation to the tube support and serving to center the free end of the shell upon partial or complete withdrawal.

21. Apparatus for fractionating oil vapor comprising a plurality of tubes, a transverse tube support connected to one end of the tubes, an annulus having inlet and outlet nozzles formed therein located above the support, the inner and outer surfaces of the annulus diverging toward the lower portion to provide a progressively thickened wall approaching the upper portion of the tube support, a shell surrounding the tubes and connected to the upper portion of the annulus, a floating head connected to the upper ends of the tubes, and means for cooling the interior of the tubes.

22. Oil refining apparatus comprising a series of tubes, a support connected to one end of the tubes, a floating head connected to the opposite end of the tubes, a shell surrounding the tubes, a cover member connected to the shell and enclosing the floating head, separate means communicating with the interior of the shell and the interior of the tubes for gaining access thereto without disconnecting either the shell or cover member, and detachable closures therefor.

23. Oil refining apparatus comprising a plurality of tubes, a support connected to one end of the tubes, floating heads connected to the opposite end of the tubes, a shell surrounding the tubes, a baffle extending longitudinally of the tubes between the floating heads, and openings formed in the baffle for directing vapor therethrough separated by longitudinal guides for centering the baffle with respect to adjacent floating heads upon relative longitudinal movement.

24. Oil refining apparatus comprising a transverse tube support, a series of tubes connected at one end to the support, a plurality of floating heads connected to the opposite ends of the tubes, a cooling fluid directing rib located in the plane of division between the heads and at the side of the tube support opposite the tubes, a cover member, and a line of detachable connections for the cover member extending into the directing rib.

25. Oil refining apparatus comprising a tube support, a plurality of tubes connected at one end of the support, a floating head connected at the opposite end of the tubes, a shell surrounding the tubes and detachably connected with the support, and means for centering and guiding the floating head with relation to the shell upon relative movement of the shell with relation to the tubes and floating head.

26. Oil refining apparatus comprising a plurality of tubes, a tube support connected at one end of the tubes, a floating head connected at the opposite end of the tubes, a shell detachably connected with the support and surrounding the tubes, and inner and outer guide means adapted respectively to center and guide the floating head and shell upon lengthwise movement of the shell with relation to the floating head and tubes.

27. Oil refining apparatus comprising a tube support, a series of tubes connected at one end to the support, a plurality of floating heads connected to the opposite ends of the tubes and each adapted to reverse the flow of cooling medium through the interior of the tubes, and a cooling fluid directing rib located adjacent the tube support and substantially in the plane of division between the floating heads, the cooling fluid directing rib having provision for the mounting of cover-securing bolts therein to permit closing of the passages upon opposite sides of the rib and in communication with the interior of adjacent floating heads when the cover is assembled and secured on a line located substantially in the plane of division between the floating heads.

28. Oil refining apparatus comprising a series of tubes, a support connected to one end of the tubes, means for causing heated medium to traverse about the exterior of the tubes, means for causing cooling medium to traverse alternately in opposite directions through the interior of the tubes, a detachable cover member for closing the cooling fluid passages when in assembled position, and a series of aligned bolting connections for the cover member, each located at the point of reversal of flow of the cooling medium at the end of the tubes adjacent the cover and between the points of flow reversal at the opposite ends of the tubes.

29. Oil refining apparatus comprising a series of tubes, a transverse tube-supporting partition connected at one end of the tubes, means upon the opposite side of the partition adjacent thereto for reversing the flow of cooling medium through the interior of the tubes, means communicating with the opposite end of the tubes to reverse the flow of cooling medium therethrough in a manner to cause the cooling medium to flow progressively through the interior of the tubes, the direction of flow alternating in opposite directions, a detachable cover member cooperating to close the cooling fluid passages beyond the partition, and a series of bolting connections securing the cover member in place and located in substantial alignment with the points of flow reversal of cooling medium adjacent the partition.

30. Heat exchange apparatus comprising a tube supporting member, heat exchange tubing supported at its lower end by the member and adapted to provide for the progressive flow of cooling fluid therethrough, a liquid passage in the member affording communication with the interior of the tubing, a shell closure surrounding the exterior of the tubing, means for detachably connecting the shell closure to the support, and means for centering the upper and generally free end of the tubing with respect to the shell closure when the latter is assembled thereabout.

31. Heat exchange apparatus comprising a tube support, heat exchange tubing connected to the support at one end and projecting therefrom, the tubing being designed for the progressive circulation of cooling fluid therethrough, a shell enclosing the tubing and detachably connected with the support to permit removal from about the tubing, means for admitting vapor to the interior of the shell through the support, and a partition member for dividing the interior of the shell into more than one vapor pass capable of removal lengthwise of the tubing with complete removal of the shell.

32. Heat exchange apparatus comprising a supporting member having a vapor inlet passage formed therein and a liquid passage formed therein and completely sealed from the vapor passage, heat exchange tubing projecting from the support and communicating interiorly with the liquid passage to provide for the progressive flow of fluid therethrough, a shell enclosing the tubing and detachably connected with the support to permit removal therefrom without disconnecting the vapor passage, and a condensate basin in communication with the space about the exterior of the tubing and associated with the tube support to collect condensate drained by gravity downwardly along the tube length.

33. Heat exchange apparatus comprising a supporting member, a tube sheet integral therewith, a peripheral flange extending from the tube sheet and an intermediate and integral rib extending from the tube sheet, a single cover member rigidly connected in detachable relationship to the support and tube sheet through connections at the peripheral flange and intermediate rib, heat exchange tubing projecting from the tube sheet, an enclosing shell detachably connected with the supporting member, and a vapor inlet nozzle connected to the supporting member and admitting vapor to the interior of the shell.

34. Heat exchange apparatus comprising a supporting member, a tube sheet integral therewith, a peripheral flange and an intermediate rib integral with the tube sheet and forming fluid passages, a cover member connected with the supporting member through the peripheral flange and intermediate rib, means for providing direct intercommunication between fluid passages at opposite sides of the rib, heat exchange tubing supported from the tube sheet and projecting therefrom, an enclosing shell surrounding the tubing and detachably connected with the supporting member to permit removal from about the tubing, means within the shell for providing more than one vapor pass about the tubing, and means connected to the supporting member for admitting vapor to the interior of the shell.

35. Heat exchange apparatus comprising a generally flat tube sheet, a reinforcing and stiffening rib formed integrally with the tube sheet and extending therefrom on opposite sides in a manner to cause the thus reinforced tube sheet to inherently resist deflection under applied stresses, a bolting flange extending peripherally about the tube sheet, a detachable closure assembled with the tube sheet at one side and serving to enclose in conjunction with the tube sheet a liquid pressure chamber, peripheral bolting connections between the closure and the flange and intermediate bolting connections between the closure and the integral reinforcing rib, the second set of bolting connections penetrating the rib only sufficiently to secure anchoring of the bolt without weakening the rib, the thus reinforced tube sheet resisting deflection due to applied stresses, and the peripheral and intermediate bolting connections resisting separation of the closure and deflection of the closure at the mid section, and heat exchange tubing connected to the tube sheet and communicating interiorly with the pressure chamber.

36. Heat exchange apparatus comprising a generally flat tube sheet of circular outline having a peripheral, circular flange and an intermediate and transverse reinforcing rib extending thereacross in a manner to adequately support and resist deflection of the entire area within the flange to produce an inherently stable, unitary member which resists deflection under the substantial pressure load applied thereto, the circular flange and the intermediate rib having bolting faces permanently maintained in predetermined and invariable relation regardless of pressure strains, a detachable and circular cover member complementing the unitary member to enclose a pressure space, and bolting connections between the cover member and circular flange and between the cover member and reinforcing rib to anchor the cover member to the unitary support through peripheral and intermediate connections and distribute the pressure load thereover.

CHARLES H. LEACH.